March 20, 1956 H. R. BENSON ET AL 2,738,938
LEVEL WIND ATTACHMENT FOR WINCHES
Filed April 29, 1953 2 Sheets-Sheet 2
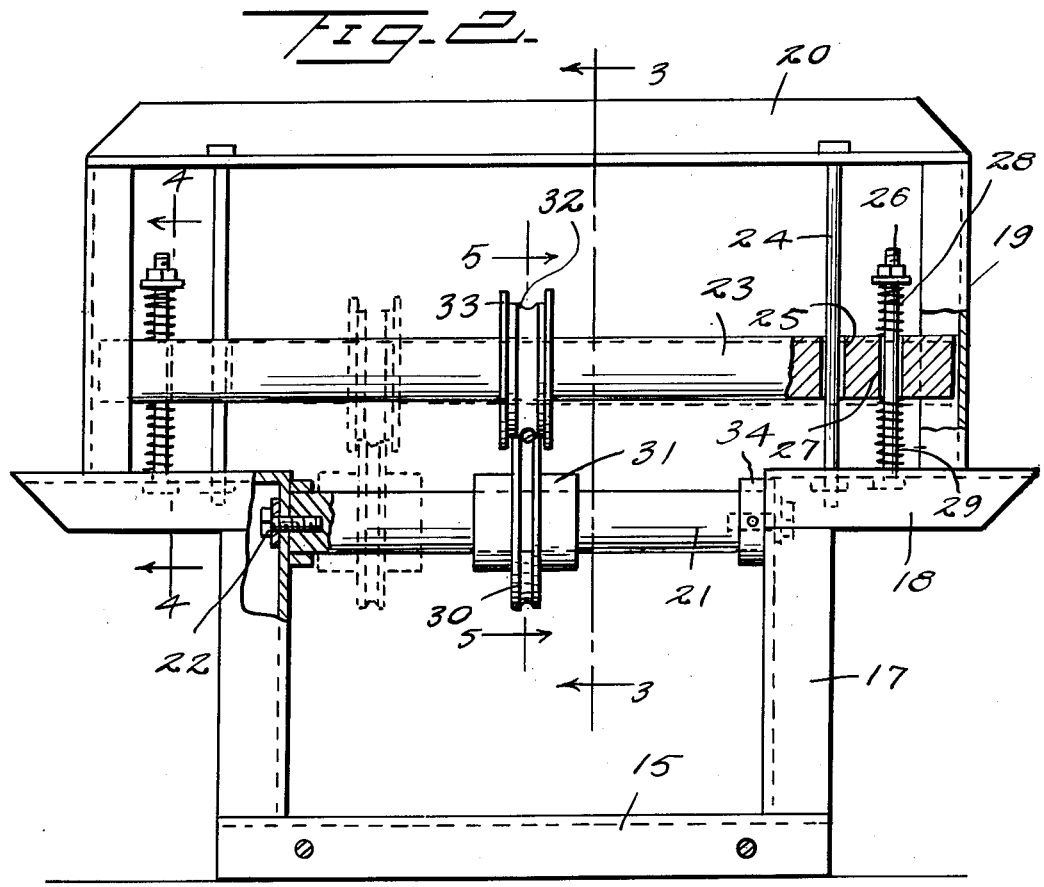
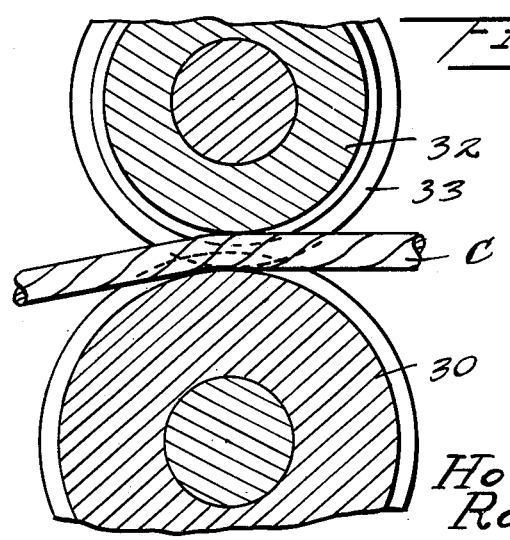
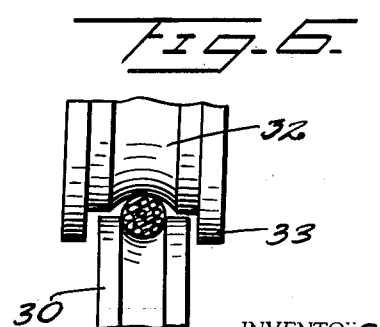
INVENTORS
Howard R. Benson
Robert H. Benson
BY
Kimmel & Crowell ATTORNEYS

United States Patent Office 2,738,938
Patented Mar. 20, 1956

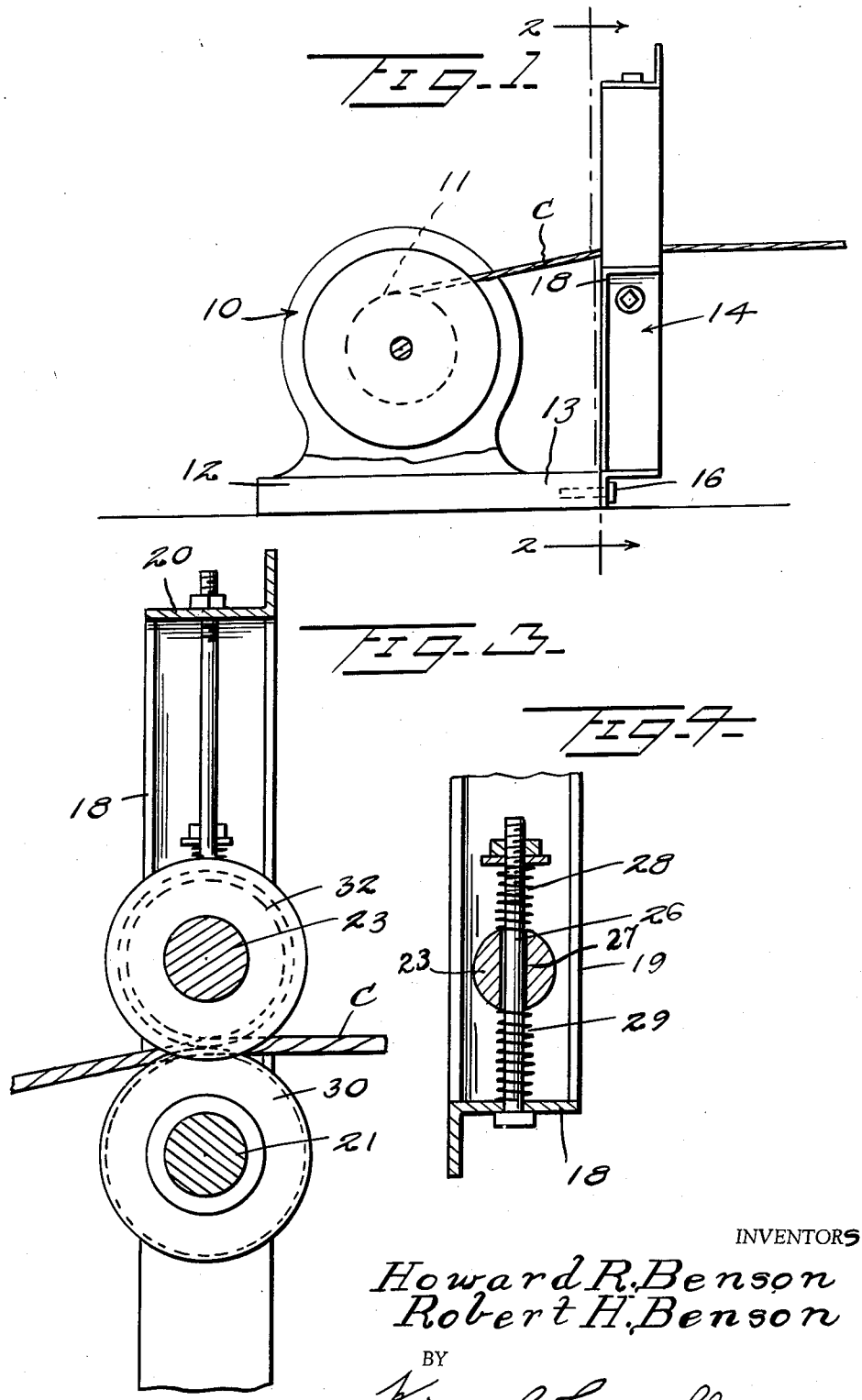

2,738,938

LEVEL WIND ATTACHMENT FOR WINCHES

Howard R. Benson and Robert H. Benson, Knoxville, Tenn.

Application April 29, 1953, Serial No. 351,802

2 Claims. (Cl. 242—157)

This invention relates to a level wind attachment for winches or winding drums.

In a winch, particularly of that type using a wire cable, when the cable is being wound on the drum the cable has a tendency to wind unevenly with one convolution climbing upon an adjacent convolution. Where this condition occurs damage to the cable usually results, and the life of the cable is foreshortened. It is, therefore, an object of this invention to provide means whereby the cable will be evenly wound upon the drum so as to eliminate any sudden jerks and strains which result from the unwinding of the cable when one convolution is wrapped upon another convolution.

Another object of this invention is to provide a level wind attachment which will make it unnecessary to groove the winding drum to assure that the first layer of cable will be evenly laid on the drum.

A further object of this invention is to provide a level wind attachment which will not only evenly wind the cable upon the winding drum, but will also smooth out kinks in the cable.

A further object of this invention is to provide a level wind attachment which is adapted to winches or winding drums of various types and sizes, and wherein one attachment will successfully operate with several different sizes of cables.

A further object of this invention is to provide a level wind attachment wherein lateral movement of the pulleys or rollers is resisted by frictional bearing of the pulleys or rollers on the supporting shafts therefor, and one of the shafts is floatingly mounted and under spring tension, so that the turns or convolutions of the cable will be tight against each other. The frictional contact of the rollers with the shafts under spring pressure is such that the lateral movement of the cable on the winding drum will move the rollers endwise on the shafts with the lateral drag on the cable caused by the rollers such as to constantly maintain the cable entering the drum tight against a preceding convolution.

With the above and other objects in view, our invention consists in the arrangement, combination and details of construction disclosed in the drawings and specification, and then more particularly pointed out in the appended claims.

In the drawings—

Figure 1 is a detailed side elevation of a level wind attachment in operative position with respect to a winch, Figure 2 is a sectional view taken on the line 2—2 of Figure 1, Figure 3 is a fragmentary sectional view taken on the line 3—3 of Figure 2, Figure 4 is a fragmentary sectional view taken on the line 4—4 of Figure 2, Figure 5 is a fragmentary sectional view taken on the line 5—5 of Figure 2, Figure 6 is a fragmentary front elevation showing the rollers in cable clamping position.

Referring to the drawings, the numeral 10 designates generally a conventional winch having a winding drum 11. The winch 10 also includes a base 12 formed with an extension 13 at the leading or cable intake side thereof.

In order to provide a means whereby the cable C may be evenly wound on the drum 11, we have provided a frame structure generally designated as 14. The frame structure 14 includes a base angle bar 15 secured by fastening means 16 to the base 13 of the winch. A pair of upright parallel bars 17 are secured to and extend from the base bar 15 and the upper ends of the upright bars 17 have fixed thereto an outwardly projecting bar 18. A second pair of upright bars 19 which are of channel-shape are fixed at their lower ends to the lateral bars 18, with the channels thereof innermost and a top angle bar 20 is fixed to the upper ends of the channel bars 19. These bars forming the frame are preferably welded together so as to provide a rigid frame structure.

A lower horizontal shaft 21 is fixedly secured between the lower upright bars 17, being secured as by fastening means 22. An upper and floating shaft 23 which is substantially longer than the shaft 21 is disposed above shaft 21 with the opposite ends of shaft 23 loosely disposed in the channels of the channel bars 19. A pair of vertically disposed parallel guide bars 24 extend between the lateral bars 18 and the upper bar 20 and loosely engage through openings 25 which are formed in the floating shaft 23.

A pair of tensioning bolts 26 are secured to and extend upwardly from the lateral bars 18 outwardly from the guide members 24, being loosely disposed through openings 27 formed in the shaft 23. Upper and lower springs 28 and 29 respectively are disposed about the bolt 26 and engage on the upper and lower sides of the shaft 23. These springs 28 and 29 are adapted to hold the shaft 23 against movement relative to the shaft 21.

A grooved roller or wheel 30 having a hub 31 is rotatably disposed on the shaft 21, and a confronting grooved pulley or wheel 32 is loosely disposed on shaft 23. Wheel or pulley 32 is formed with a pair of annular flanges 33 which overlap the opposite ends of wheel or roller 30 so that the grooves of the two wheels or rollers 30 and 32 will always be maintained in confronting position. The endwise movement of roller or wheel 30 may be limited by means of a pair of collars 34 which are adjustably secured on the lower shaft 21. These collars 34 are spaced apart a distance substantially equal to the width of the winding drum 11.

In the use and operation of this device, the cable C is passed between the rollers 30 and 32 and is trained about the winding drum 11. The springs 28 and 29 are such as to bind the cable C between the grooved rollers and to place the rollers 30 and 32 under frictional tension with respect to the shaft 21 and 23. This frictional contact of the rollers with respect to the shafts is such as to resist endwise movement of the rollers and thereby hold the cable C into tight engagement with the preceding convolution of the cable on the drum 11.

The floating shaft 23 will, when the rollers 30 and 32 are in the mid position, be disposed parallel with shaft 21. However, as the rollers move to the left, as viewed in Figure 2, the springs at the opposite right end of shaft 23 will move this shaft downwardly to substantially the dotted line position shown in Figure 2. This rocking or tilting of the shaft 23 will have the tendency to cause the roller or wheel 32 to climb upwardly on shaft 23 under the sidewise strain or torque produced by the cable C as the latter is wound upon the winding drum 11. The level wind attachment hereinbefore described may be positioned at any angular position with respect to the winding drum 11, the position of the attachment depending on the angle at which the cable enters the drum 11.

We do not mean to confine ourselves to the exact details of construction herein disclosed, but claim all varia-

What we claim is:

1. A level wind adapted for use with a cable winch comprising a frame, a shaft mounted in said frame for sliding movement in a fixed plane passing through the axis of said shaft, opposed balanced springs mounting each end of said shaft in said frame, a second shaft secured to said frame with its axis lying in said fixed plane, in confronting parallel relation to said first named shaft, a peripherally grooved pulley journalled on said fixed shaft and adapted for axial movement thereon, a second peripherally grooved pulley journalled on said sliding shaft and adapted for axial movement thereon, said grooved pulleys being adapted to engage on opposite sides of a cable to guide the cable during winding on the winch by rocking said sliding shaft out of paraellism with said fixed shaft while the axes of said shafts remain in a common plane.

2. A device as claimed in claim 1 wherein means are provided to vary the tension on said springs to adjust said movable shaft with relation to said fixed shaft.

References Cited in the file of this patent

UNITED STATES PATENTS

| | | |
|---|---|---|
| 481,165 | Darrow | Aug. 23, 1892 |
| 941,722 | Moulton | Nov. 30, 1909 |
| 998,385 | Owen | July 18, 1911 |
| 2,380,801 | Stover | July 31, 1945 |